United States Patent
Nogami et al.

(10) Patent No.: US 8,074,974 B2
(45) Date of Patent: Dec. 13, 2011

(54) VEHICLE HEIGHT ADJUSTING DEVICE

(75) Inventors: Syusaku Nogami, Tokyo (JP); Tomohiko Baba, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 1120 days.

(21) Appl. No.: 11/727,144

(22) Filed: Mar. 23, 2007

(65) Prior Publication Data

US 2007/0227847 A1 Oct. 4, 2007

(30) Foreign Application Priority Data

Mar. 28, 2006 (JP) ................... 2006-086793
Dec. 12, 2006 (JP) ................... 2006-334188

(51) Int. Cl.
*F16F 9/14* (2006.01)
*F16F 9/34* (2006.01)

(52) U.S. Cl. .................. 267/64.17; 188/322.14

(58) Field of Classification Search ............ 267/DIG. 1, 267/DIG. 2, 64.14, 64.16, 64.17; 188/322.21, 188/322.13, 322.14, 322.19
See application file for complete search history.

(56) References Cited

U.S. PATENT DOCUMENTS

| | | | | |
|---|---|---|---|---|
| 2,802,664 A | * | 8/1957 | Jackson | 267/64.19 |
| 3,904,183 A | * | 9/1975 | Allinquant et al. | 267/64.17 |
| 5,647,580 A | * | 7/1997 | Buma | 267/64.17 |
| 5,988,655 A | * | 11/1999 | Sakai et al. | 280/6.159 |

FOREIGN PATENT DOCUMENTS

| | | |
|---|---|---|
| DE | 4424991 A1 | 4/1995 |
| DE | 19602166 B4 | 8/1996 |
| JP | 8-135716 | 5/1996 |
| JP | 8-142630 | 6/1996 |
| JP | 10-306837 | 11/1998 |

\* cited by examiner

*Primary Examiner* — Bradley King
*Assistant Examiner* — Vishal Sahni
(74) *Attorney, Agent, or Firm* — Rabin & Berdo, P.C.

(57) ABSTRACT

A vehicle height adjusting device includes a cylinder (1), a rod (3) inserted in the cylinder (1), a piston (4) connected to the rod (3) and movable within the cylinder (1), and defining a rod side chamber (2a) and an non-rod side chamber (2b) in the cylinder (1), damping parts (4a, 4b) for generating a damping force by the movement of the rod (3), a high pressure chamber (18) and a low pressure chamber (16) charged with gas, a pump chamber (25) for adjusting the vehicle height by supplying the working fluid in the low pressure chamber (16) into the non-rod side chamber (2b), a communicating path (5a) for communicating the non-rod side chamber (2b) and the high pressure chamber (18), and a valve body (20) for increasing and reducing a channel area of the communicating path (5a) depending on the fluid pressure of the high pressure chamber (18).

4 Claims, 5 Drawing Sheets

VEHICLE HEIGHT ADJUSTING DEVICE

TECHNICAL FIELD OF THE INVENTION

The present invention relates to a vehicle height adjusting device. Particularly, it relates to an improvement on the vehicle height adjusting device capable of adjusting the height of a moving vehicle by utilizing a self-pumping action.

DESCRIPTION OF RELATED ART

A vehicle height adjusting device that adjusts the height of a vehicle lowered by a loading of luggage or the like to the appropriate vehicle height by a self-pumping action while the vehicle is moving, and that is applied to a multi cylinder type hydraulic damper structure, is known from Japanese Patent Application Laid-open No.10-306837.

This vehicle height adjusting device realizes the predetermined damping function at a damping part provided to a piston by an extending and contracting action when the vehicle body is moved up and down by vibrations exerted to the moving vehicle. At the same time, the device adjusts the vehicle height lowered by a loading of luggage and the like to the appropriate vehicle height by supplying working oil into a cylinder by the self-pumping action.

SUMMARY OF THE INVENTION

The vehicle height adjusting device of this type is mainly employed with a vehicle whose height tends to become low when the vehicle weight has been changed greatly by loading of luggage or the like. However, the conventional vehicle height adjusting device cannot achieve a large damping force to respond to an increase in the vehicle weight since the damping force generated by the damping part of the piston is constant.

Therefore, when a vehicle runs over projections on the road, a bottom scratching phenomena or an upward knocking phenomena of the vehicle body tends to occur due to a lack of vibration damping function and a comfortableness on the vehicle is diminished.

The present invention has been designed in consideration of the above mentioned problems, and it is an object thereof to provide a vehicle height adjusting device which may adjust a vehicle height of the vehicle by a self-pumping action and is also capable of realizing a preferred damping force property when the vehicle weight is increased.

In order to achieve the above object, the present invention provides a vehicle height adjusting device capable of adjusting a vehicle height of a vehicle. The vehicle height adjusting device comprises a cylinder charged with working fluid, a rod inserted in the cylinder so as to be movable in back and forward, a piston connected to the rod and movable within the cylinder in a freely sliding manner, and defining a rod side chamber and an non-rod side chamber in the cylinder, a damping part provided to the piston and for generating a damping force by a passage of the working fluid by the back and forward movement of the rod, a low pressure chamber provided outside the cylinder and charged with low pressure gas in a part thereof, a high pressure chamber provided outside the cylinder and charged with high pressure gas in a part thereof, a pump chamber for adjusting the vehicle height of the vehicle by supplying the working fluid in the low pressure chamber into the non-rod side chamber with the back and forward movement of the rod, a communicating path for communicating the non-rod side chamber and the high pressure chamber, and a valve body for increasing and reducing a channel area of the communicating path depending on the fluid pressure of the high pressure chamber.

DETAILED DESCRIPTION OF THE INVENTION

Embodiments of the present invention will be described below with reference to the attached drawings.

The First Embodiment

The vehicle height adjusting device 100 of the first embodiment of the present invention will be described with reference to FIG. 1 to FIG. 3.

The vehicle height adjusting device 100 is that employed to a hydraulic damper having a self-pumping function, and is constructed such that a damping force is generated and at the same time it is extended by a self-pumping action during the extending and contracting movement of the hydraulic damper.

The vehicle height adjusting device 100 is interveningly installed, together with a suspension spring (not shown), between the vehicle body and an axle shaft of the vehicle, and arranged, for example, at each of front wheels and rear wheels of the vehicle. The vehicle height adjusting device 100 extends in order to prevent scratching of the bottom of a moving vehicle by appropriately adjusting the vehicle height.

Since it is the rear wheel side where the vehicle height is lowered by boarding of passengers or loading of luggage in most of the vehicles, the vehicle height adjusting device 100 is arranged, in some cases, only at the rear wheel side of the vehicle.

Figure 1:
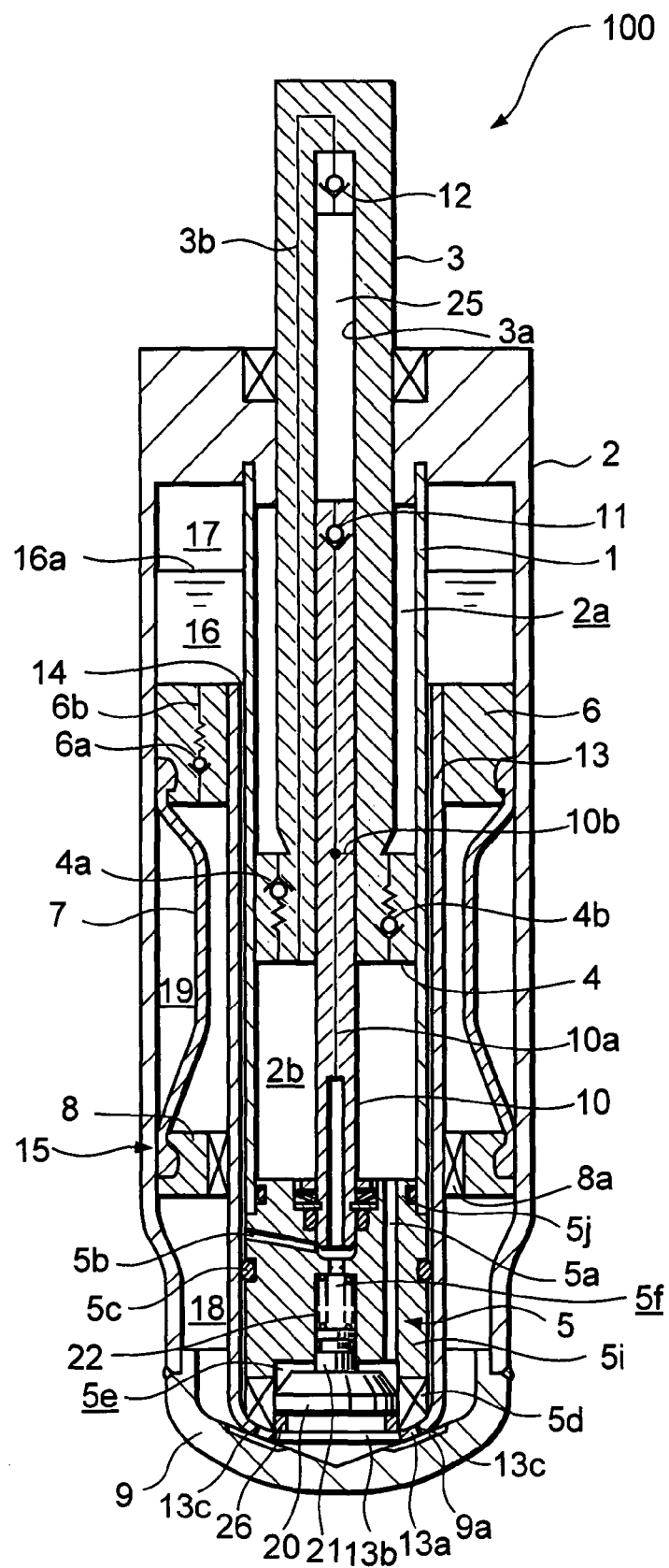
FIG. 1 is a cross sectional diagram showing the vehicle height adjusting device of the first embodiment of the present invention.

As illustrated in FIG. 1, the vehicle height adjusting device 100 is a hydraulic damper of multi barrel type with an outside barrel 2 arranged at outside the cylinder 1 as an inside barrel, and having a volume chamber 15 functions as a reservoir chamber between the cylinder 1 and the outside barrel 2.

The working oil as working fluid is charged in the cylinder 1 and a rod 3 is inserted in the cylinder 1 so as to be movable in back and forward. A piston 4, movable within the cylinder 1 in a freely sliding manner and defines inside the cylinder 1 into a rod side chamber 2a and an non-rod side chamber 2b, is connected to the one end of the rod 3. Further, the other end of the rod 3 extends out of the outside barrel 2. The gap between the inner periphery of the cylinder 1 and the outer periphery of the rod 3 is blocked by a part of the outside barrel 2.

An end part opening of the cylinder 1 at the non-rod side chamber 2b side is blocked by a bottom block 5. The bottom block 5 comprises a body part 5i formed with the approximately the same outer diameter as the cylinder 1 and a small diameter part 5j formed at the tip end of the body part 5i, and the small diameter part 5*j* fits into the end part opening of the cylinder 1 thereby blocking the end part opening.

The rod side chamber 2*a* and the non-rod side chamber 2*b* are mutually in communication through an extending damping valve 4*a* and a compressing damping valve 4*b* as damping parts arranged to the piston 4. The extending damping valve 4*a* only allows a flow of the working oil from the rod side chamber 2*a* to the non-rod side chamber 2*b*, and the compressing damping valve 4*b* only allows a flow of the working oil from the non-rod side chamber 2*b* to the rod side chamber 2*a*. The working oil flows to-and-from between the rod side chamber 2*a* and the non-rod side chamber 2*b* through the extending damping valve 4*a* and the compressing damping valve 4*b* as a result of the back and forward movement of the rod 3 within the cylinder 1. A damping force is generated when the working oil passes through the extending damping valve 4*a* and the compressing damping valve 4*b*.

A tubular shaped guide pipe 13 is arranged at the outer periphery of the cylinder 1 and the bottom block 5 with a predetermined gap. A bent part 13*a* bent to inside is formed at the lower end part of the guide pipe 13, and the bent part 13*a* is sandwiched between the lower end of the bottom block 5 and a bottom member 9 with which the lower end opening of the outside barrel 2 is blocked. The guide pipe 13 is, thereby, positioned to the outer periphery of the cylinder 1 and the bottom block 5.

The volume chamber 15 is defined into two pressure chambers a part of which is charged with gas, by a ring-shaped barrier member 6 disposed between the inner periphery of the outside barrel 2 and the outer periphery of the guide pipe 13. A low pressure chamber 16 having an air chamber 17 into which the low pressure gas is charged with bordering at the oil surface 16*a* is defined at upper side (rod side) of the barrier member 6, and a high pressure chamber 18 where an air chamber 19 is separated by a bladder 7 is defined below (non-rod side) the barrier member 6.

A path 6*b* for communicating the high pressure chamber 18 and the low pressure chamber 16 is provided to the barrier member 6, and in this path 6*b*, there is arranged a relieving valve 6*a* allowing a flow of the working oil from the high pressure chamber 18 to the low pressure chamber 16 when the pressure difference between the high pressure chamber 18 and the low pressure chamber 16 reached to the predetermined level or higher.

A ring-shaped retainer 8 is disposed between the inner periphery of the outside barrel 2 and the outer periphery of the guide pipe 13 in the high pressure chamber 18. A plurality of notched paths 8*a* which penetrate through the retainer 8 in vertical direction (axial direction of the rod 3) are formed in the inner periphery of the retainer 8.

The bladder 7 is interveningly installed between the barrier member 6 and the retainer 8, with the one end thereof is sandwiched between the barrier member 6 and the inner periphery of the outside barrel 2 so as to be pushed towards the outside barrel 2, and the other end thereof is sandwiched between the retainer 8 and the inner periphery of the outside barrel 2 so as to be pushed towards the outside barrel 2.

A communicating path 5*a* which penetrates through the bottom block 5 in vertical direction (axial direction of the rod 3) is formed in the bottom block 5, and as described subsequently, the non-rod side chamber 2*b* and the high pressure chamber 18 are communicated through this communicating path 5*a*.

High pressure inert gas is charged into the air chamber 19 which is defined between the bladder 7 and the inner periphery of the outside barrel 2. The oil pressure within the non-rod side chamber 2*b* is maintained at a high pressure state by this gas pressure within the air chamber 19, thereby the vehicle height adjusting device 100 is biased to the extending direction.

In the vehicle height adjusting device 100 constructed as above, during the contracting movement that the rod 3 enters into the cylinder 1, a portion of the working oil in the non-rod side chamber 2*b* flows into the rod side chamber 2*a* through the compressing damping valve 4*b* and at the same time, an excess amount of working oil that is equal to the volume of the portion of the rod that enters in the non-rod side chamber 2*b*, flows into the high pressure chamber 18 through the communicating path 5*a* of the bottom block 5, as a result of a lowering of the piston 4.

Therefore, the damping force is generated as the working oil passes through the compressing damping valve 4*b* and at the same time, the spring force of the air chamber 19 resulting from the compression of the bladder 7 caused by the inflow of the working oil into the high pressure chamber 18 is exerted.

In addition, in the case where the rod 3 enters into the cylinder 1 at high speed and with large stroke in the contracting movement, and the amount of the working oil flowing into the high pressure chamber 18 increases at once, the relieving valve 6*a* arranged to the barrier member 6 is operated to open and the working oil in the high pressure chamber 18 flows into the low pressure chamber 16. An occurrence of a damaging of a seal, a leaking of the working oil or the like is thus prevented.

In the vehicle height adjusting device 100, during the extending movement that the rod 3 exits from the cylinder 1, a portion of the working oil in the rod side chamber 2*a* flows into the non-rod side chamber 2*b* through the extending damping valve 4*a* and at the same time, deficient amount of the working oil equals to the rod withdrawal volume portion in the non-rod side chamber 2*b* is supplied from the high pressure chamber 18 through the communicating path 5*a*, as a result of lifting up of the piston 4.

Therefore, the damping force is generated as the working oil passes through the extending damping valve 4*a* and at the same time, the spring force of the air chamber 19 resulting from the expansion of the bladder 7 caused by the outflow of the working oil from the high pressure chamber 18 is exerted.

As described above, in the vehicle height adjusting device 100, during the extending and contracting movement, the predetermined damping function is realized by the damping parts arranged to the piston 4 and at the same time, a rod reaction force can be obtained by the gas pressure of the air chamber 19 defined by the bladder 7.

Next, the self-pumping mechanism for adjusting the vehicle height will be described.

A cylinder hole 3*a* opening towards the non-rod side chamber 2*b* is formed in the axial core part of the rod 3, and a pump rod 10 which is fluid tightly connected to the bottom block 5 at the one end thereof is inserted in the cylinder hole 3*a* in a freely sliding manner.

In the pump rod 10, a through hole 10*a* which penetrates through in the axial direction is formed, and the one end of the through hole 10*a* is communicated to a port 5*b* formed in the bottom block 5. The port 5*b* is opened to the outer periphery surface of the bottom block 5, and communicates with a tubular low pressure channel 14 defined between the outer peripheries of the cylinder 1 and the bottom block 5, and the inner periphery of the guide pipe 13. Further, the low pressure channel 14 is in communication with the low pressure chamber 16.

The other end of the through hole 10*a* communicates with a pump chamber 25 defined by the inner periphery of the cylinder hole 3*a* and the end surface of the pump rod 10.

Therefore, the pump chamber 25 and the low pressure chamber 16 are in communication through the through hole 10a, the port 5b, and the low pressure channel 14.

A through hole 3b which communicates the pump chamber 25 and the non-rod side chamber 2b is formed in the rod 3. As described above, the non-rod side chamber 2b is in communication with the low pressure chamber 16 through the pump chamber 25.

In the through hole 10a, an intake valve 11 of a non-return valve structure which only allows the flow of the working oil from the through hole 10a to the pump chamber 25 is interveningly installed, and in the through hole 3b, a delivery valve 12 of the non-return valve structure which only allows the flow of the working oil from the pump chamber 25 to the through hole 3b is interveningly installed.

Further, in the pump rod 10, a leveling port 10b having an opening on the outer periphery surface and communicates with the through hole 10a is formed.

In the self-pumping mechanism as constructed above, during the extending and contracting movement in which the rod 3 moves back and forward within the cylinder 1, the vehicle height adjusting device 100 undergoes the self-pumping action as followings.

First, during the contracting movement in which the rod 3 enters into the cylinder 1, the pump chamber 25 is compressed as the pump rod 10 enters into the cylinder hole 3a of the rod 3. Thereby, the working oil within the pump chamber 25 flows into the non-rod side chamber 2b through the delivery valve 12 and passing the through hole 3b.

Next, during the extending movement in which the rod 3 withdraws from the cylinder 1, the pump chamber 25 is expanded as the pump rod 10 withdraws from the cylinder hole 3a of the rod 3. Thereby, the working oil in the through hole 10a of the pump rod 10 flows into the pump chamber 25 through the intake valve 11 by a sucking phenomena within the pump chamber 25. Further, the working oil in the low pressure chamber 16 is supplied to the through hole 10a through the low pressure channel 14 and the port 5b.

Therefore, the working oil within the low pressure chamber 16 flows continuously to the non-rod side chamber 2b of the cylinder 1 through the pump chamber 25 by a repetitive extending and contracting movement of the vehicle height adjusting device 100. In another word, by the back and forward movement of the rod 3 within the cylinder 1, the pump chamber 25 realizes pumping function where the working oil in the low pressure chamber 16 is supplied to the non-rod side chamber 2b. This is the self-pumping action.

Further, the non-rod side chamber 2b functions such that the rod 3 is projected from the cylinder 1 through the piston 4, because the non-rod side chamber 2b is in the state communicated with the high pressure chamber 18 and the high pressure chamber 18 has the oil pressure resulting from the gas pressure of the air chamber 19. The vehicle body is lifted up by the vehicle height adjusting device 100 by such mechanisms.

If the supply of the working oil to the non-rod side chamber 2b is continued to lift the piston 4 up sufficiently and once the vehicle height of vehicle becomes high, the non-rod side chamber 2b becomes communicated to the leveling port 10b of the pump rod 10 since the pump rod 10 projects out greatly from the cylinder hole 3a of the rod 3.

In this case, the working oil in the non-rod side chamber 2b reversingly flows to the low pressure chamber 16 through the leveling port 10b to stop further lifting up of the piston 4. This reversing flow of the working oil continues until the non-rod side chamber 2b shrinks to block the leveling port 10b with the inner periphery of the rod 3. As described above, the extension of the rod 3 can be limited by the leveling port 10b and the vehicle height can be kept at the constant height.

In addition, during the vehicle height adjusting device 100 continues to extend with the self-pumping mechanism, or when the extended state is maintained after the extension is finished, if there is an occurrence of the situation where the rod 3 enters into the cylinder 1 at a high speed and with a large stroke, the relieving valve 6a provided in the barrier member 6 is operated to open, thereby the working oil in the high pressure chamber 18 flows into the low pressure chamber 16. In the case where the excessive amount of the working oil is returned to the low pressure chamber 16 from the high pressure chamber 18, the vehicle height adjusting device 100 contracts to bring the vehicle height lower than the prescribed level and the leveling port 10b is blocked. Once the leveling port 10b is blocked, the vehicle height is brought back to the high state by the aforementioned self-pumping action.

In the above, although the pump rod 10 is constructed that it is inserted directly to the cylinder hole 3a formed in the rod 3, it can also be constructed such that a pump cylinder with which the pump rod 10 is slidably movable is arranged to the rod 3. In that case, a tubular channel equivalent to above mentioned through hole 3b is constructed between the outer periphery of the pump cylinder and the inner periphery of the rod 3.

As described above, the vehicle height adjusting function can be realized to maintain the vehicle height to the appropriate predetermined level with the vehicle height adjusting device 100. However, if the vehicle weight is increased at the state that the vehicle height is maintained at the appropriate predetermined level, the comfortableness on the vehicle tends to be diminished.

Structures to prevent diminishing of the comfortableness on the vehicle even when the vehicle weight is increased at the state that the vehicle height is maintained at the appropriate predetermined level will now be described below with reference to FIG. 2 and FIG. 3 mainly.

A volume chamber 5e having an opening part on the end surface facing the bottom member 9 (the other side surface of the surface facing the non-rod side chamber 2b) is formed in the bottom block 5 and the opening part of the volume chamber 5e is in communication with a lower end opening part 13b of the guide pipe 13.

A path 9a communicating the volume chamber 5e and the high pressure chamber 18 is formed on a bottom surface of the bottom member 9 which together with the bottom block 5, sandwiches the bent part 13a of the guide pipe 13.

In surrounding wall of the volume chamber 5e in the bottom block 5, a plurality of notched paths 5d are formed so as to be opened to the inner peripheral surface. In addition, a sealing member 5c is forcedly inserted between the outer periphery of the bottom block 5 and the inner periphery of the guide pipe 13 so as not to communicate the volume chamber 5e and the low pressure channel 14 through this notched path 5d.

A valve body 20 which is movable in a freely sliding manner along the inner peripheral surface of the volume chamber 5e is containably installed within the volume chamber 5e. A guide part 21 formed with the smaller diameter than the valve body 20 is projectively formed in an axial core part of the valve body 20, and the guide part 21 is inserted in a freely sliding manner into a guide hole continuously formed with the volume chamber 5e.

A pilot chamber 5f is defined by the guide part 21 and the guide hole, and the pilot chamber 5f is in communication with the low pressure chamber 16 through the communicating hole 5g formed in the bottom block 5 and the port 5b. Thus the working oil in the low pressure chamber 16 is guided, to the pilot chamber 5f.

In addition, a restrictor 5h is formed in the communicating hole 5g for applying a resistance to the working oil passing therethrough. The restrictor 5h acts to prevent the chattering phenomena of the valve body 20 in the volume chamber 5e.

In a pilot chamber 5f, a spring 22 as a biasing member is containably installed for biasing the valve body 20 to the direction that the guide part 21 is withdrawn from the pilot chamber 5f. In another word, the spring 22 biases the valve body 20 against the oil pressure of the high pressure chamber 18. A ring shaped retaining ring 26 is forcedly inserted to the inner periphery of the opening end part of the volume chamber 5e to prevent the valve body 20 from ejected out from the volume chamber 5e by the biasing force of the spring 22.

A notch 13c is formed to the bent part 13a of the guide pipe 13 and the notched path 5d of the bottom block 5 and the path 9a of the bottom member 9 are fixedly communicated to each other through the notch 13c.

In addition, it can be constructed that, instead of the notch 13c formed to the guide pipe 13, a notch may be formed to the retaining ring 26 at the position corresponding to the notched path 5d of the bottom block 5 such that the notched path 5d of the bottom block 5 and the path 9a of the bottom member 9 are fixedly communicated each other.

The non-rod side chamber 2b and the high pressure chamber 18 are fixedly communicated to each other through the communicating path 5a, the notched path 5d of the bottom block 5, the notch 13c of the guide pipe 13 and the path 9a of the bottom member 9 irrespective of the position of the valve body 20, thereby if there is no flow of the working oil between the non-rod side chamber 2b and the high pressure chamber 18, the non-rod side chamber 2b, the volume chamber 5e and the high pressure chamber 18 are in the equally pressurized state.

The position of the valve body 20 in the volume chamber 5e is decided by a load applied to the cross-sectional area of the guide part 21. The advancing load for bringing the valve body 20 to move (hereinafter referred to as "advance".) to the direction that the pilot chamber 5f is contracted is calculated from a multiplication (S×Ph) of the cross-sectional area S of the guide part 21 and the pressure Ph of the high pressure chamber 18 applied to the back side of the valve body 20. On the other hand, the reversing load for bringing the valve body 20 to move (hereinafter referred to as "reverse".) to the direction that the pilot chamber 5f is expanded is calculated from an addition (S×P1+L) of a multiplication (S×P1) of the cross-sectional area S of the guide part 21 and the pressure P1 of the low pressure chamber 16 introduced to the pilot chamber 5f, and the biasing force of the spring 22 (L).

The valve body 20 advances when a load calculated from the pressure difference between the high pressure chamber 18 and the low pressure chamber 16, and the cross-sectional area S of the guide part 21 is greater than the biasing force of the spring 22, in another word, when the advancing load is greater than the reversing load. On the other hand, the valve body 20 reverses when the advancing load is smaller than the reversing load.

Next, a channel connecting the non-rod side chamber 2b and the high pressure chamber 18 and the channel area thereof will be described.

Figure 2:
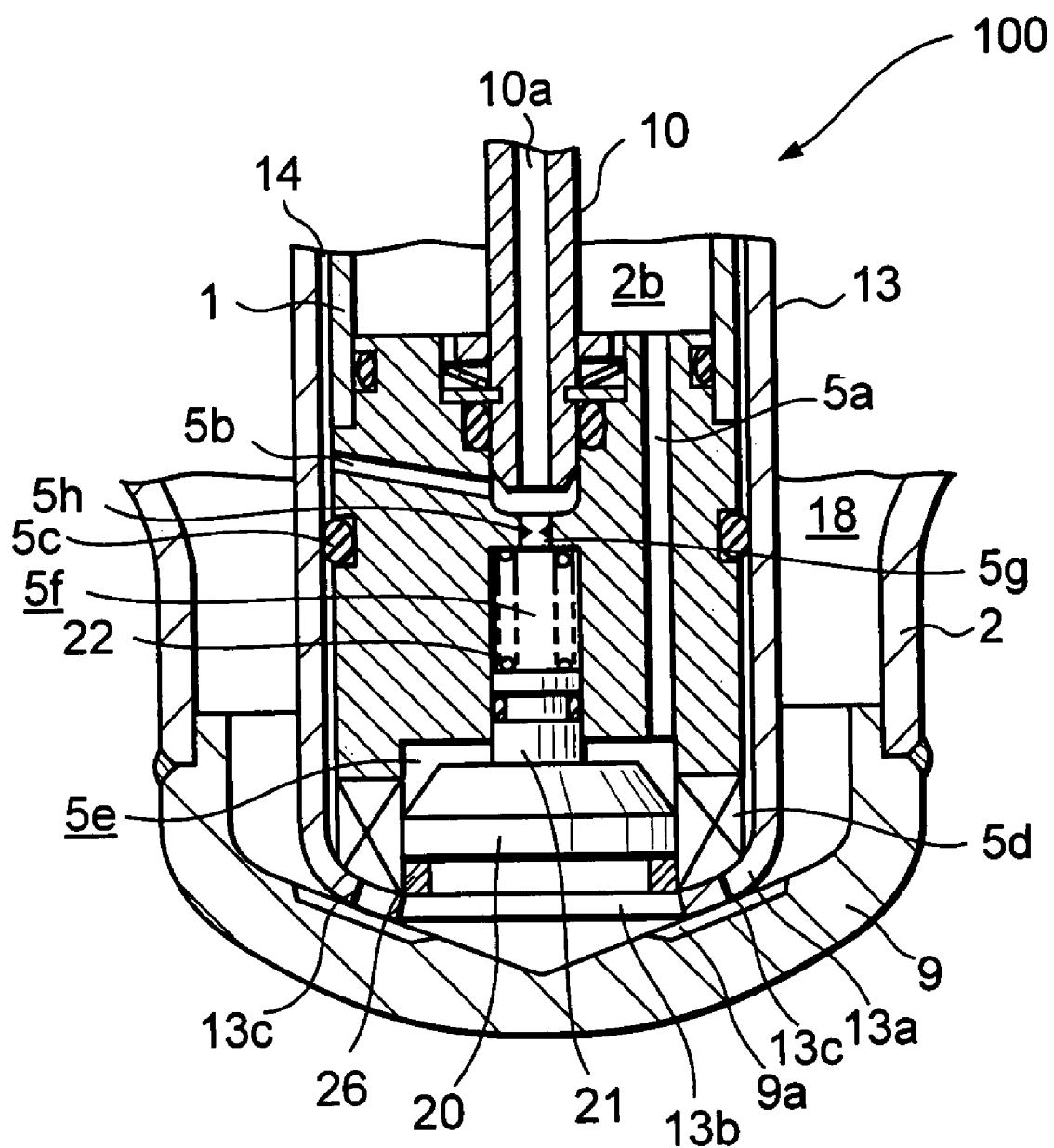
FIG. 2 is a partial cross sectional diagram showing essential parts of the vehicle height adjusting device illustrated in FIG. 1 in enlarged scale.
Figure 3:
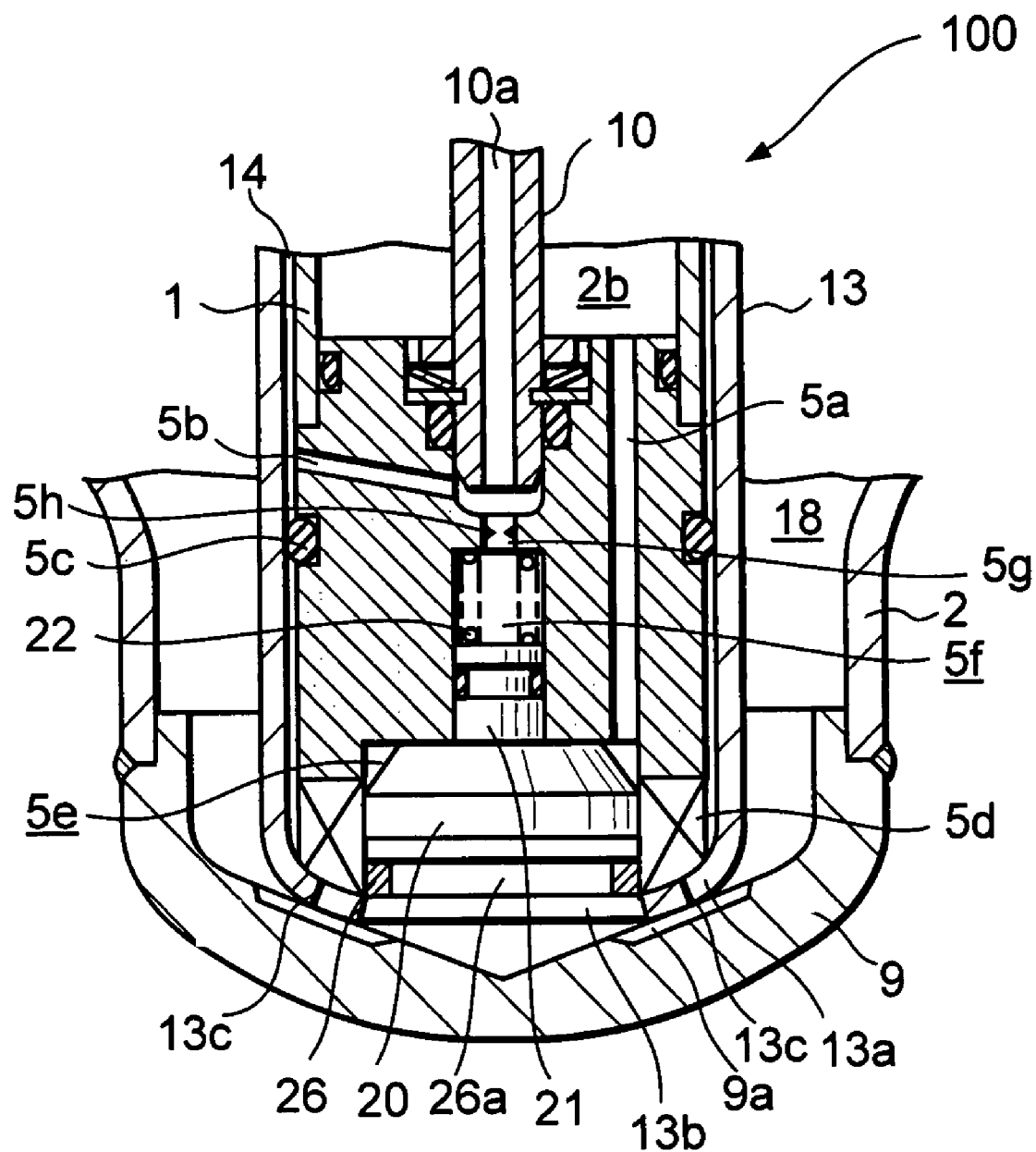
FIG. 3 is a partial cross sectional diagram showing, as similar to FIG. 2, essential part of the vehicle height adjusting device in enlarged scale.

When the advancing load applied to the valve body 20 is smaller than the reversing load, as illustrated in FIG. 2, the pilot chamber 5f is expanded and the back side of the valve body 20 becomes a state contacted to the retaining ring 26 by the biasing force of the spring 22.

In this state, the non-rod side chamber 2b and the high pressure chamber 18 are communicated to each other through the communicating path 5a, the notched path 5d, the notch 13c and the path 9a. At this time, the valve body 20 maximizes the opening area in the notched path 5d to the volume chamber 5e. In another word, the channel area of the communicating path 5a is maximized, and the resistance to the working oil passing through is minimized.

On the other hand, when the advancing load applied to the valve body 20 becomes greater than the reversing load as the pressure of the high pressure chamber 18 is increased, the valve body 20 advances to reduce the opening area in the notched path 5d to the volume chamber 5e. Then, if the pressure in the high pressure chamber 18 is increased sufficiently, as illustrated in FIG. 3, the valve body 20 becomes the state contacted to the bottom surface in the volume chamber 5e.

In this state, the non-rod side chamber 2b and the high pressure chamber 18 are communicated to each other through the communicating path 5a, the notched path 5d, the hollow part 26a in the retaining ring 26, and the path 9a. At this time, the valve body 20 minimizes, with the outer periphery surface thereof, the opening area in the notched path 5d in the volume chamber 5e. In another word, the channel area in the communicating path 5a is minimized and the channel resistance to the working oil passing through is maximized.

From the above, when the load on the vehicle is increased and the vehicle weight is increased, the pressure in the high pressure chamber 18 becomes greater since the working oil within the non-rod side chamber 2b is compressed in the vehicle height adjusting device 100. Thereby, the valve body 20 advances to reduce the channel area of the communicating path 5a.

When the vehicle height adjusting device 100 undergoes the contracting movement in this state, the predetermined damping force is generated by the compressing damping valve 4b arranged to the piston 4 and at the same time, the channel area of the communicating path 5a is set by the advance of the valve body 20 in accordance with the increase in the oil pressure in the high pressure chamber 18 and so the channel resistance is generated depending on the channel area of the communicating path 5a when the working oil of the amount equal to the entry volume portion of the rod 3 flows into the high pressure chamber 18 from the non-rod side chamber 2b.

On the other hand, when the vehicle height adjusting device 100 undergoes the extending movement, the predetermined damping force is generated by the extending damping valve 4a arranged to the piston 4 and at the same time, the channel area of the communicating path 5a is set by the reverse of the valve body 20 in accordance with the decrease in the oil pressure in the high pressure chamber 18 and so the channel resistance (suction resistance) is generated depending on the channel area of the communicating path 5a when the working oil of the amount equal to the withdrawal volume portion of the rod 3 flows (sucked) into the non-rod chamber 2b from the high pressure chamber 18.

As described above, the position of the valve body 20 in the volume chamber 5e is determined by the pressure in the high pressure chamber 18, the greater the vehicle weight becomes the greater the pressure in the high pressure chamber 18 becomes and so the valve body 20 advances to reduce the channel area in the communicating path 5a. In another word, the greater the vehicle weight becomes, the greater the channel resistance of the working oil generated by the valve body 20 becomes. Therefore, the vehicle height adjusting device 100 generates the predetermined damping force by the damping parts arranged to the piston 4 and the greater the vehicle weight, the greater the damping force generated by the valve body 20.

According to the above mentioned first embodiment, the effects described below are obtained.

The vehicle height adjusting device 100 have the self-pumping mechanism therein, thereby the vehicle height is adjusted to the appropriate vehicle height by undergoing extending movement by the self-pumping action when the vehicle height tends to be lowered as a result of the increased vehicle weight by the loading of luggage and the like.

Further, the vehicle height adjusting device 100 is provided with the valve body 20 for increasing or reducing the channel area of the communicating path 5a communicating the non-rod side chamber 2b and the high pressure chamber 18 of the cylinder 1 depending on the oil pressure in the high pressure chamber 18, and when the oil pressure in the high pressure chamber 18 is increased as a result of the increase of the vehicle weight by loading of luggage and the like, the channel area of the communicating path 5a is reduced by the valve body 20. Thus the vehicle height adjusting device can increase the damping force during the extending and contracting movement thereby realizes the damping force property suitable to the increased load.

Therefore, an occurrence of the bottom scratching resulting from the substantial lowering of the vehicle height is prevented even when the vehicle runs over projections and the like on road surface, and the same time, the comfortableness on the vehicle is not diminished even when the vehicle height is raised at the state that the vehicle weight has been increased, since the damping property suitable to the load on the vehicle can be achieved.

The Second Embodiment

The vehicle height adjusting device 200 of the second embodiment of the present invention will be described with referring to FIG. 4 and FIG. 5.

In the following, differences between the vehicle height adjusting device 100 of the above mentioned first embodiment are mainly described, and the identical numerical figures are designated and description is omitted for the members same as those in the vehicle height adjusting device 100.

Figure 4:
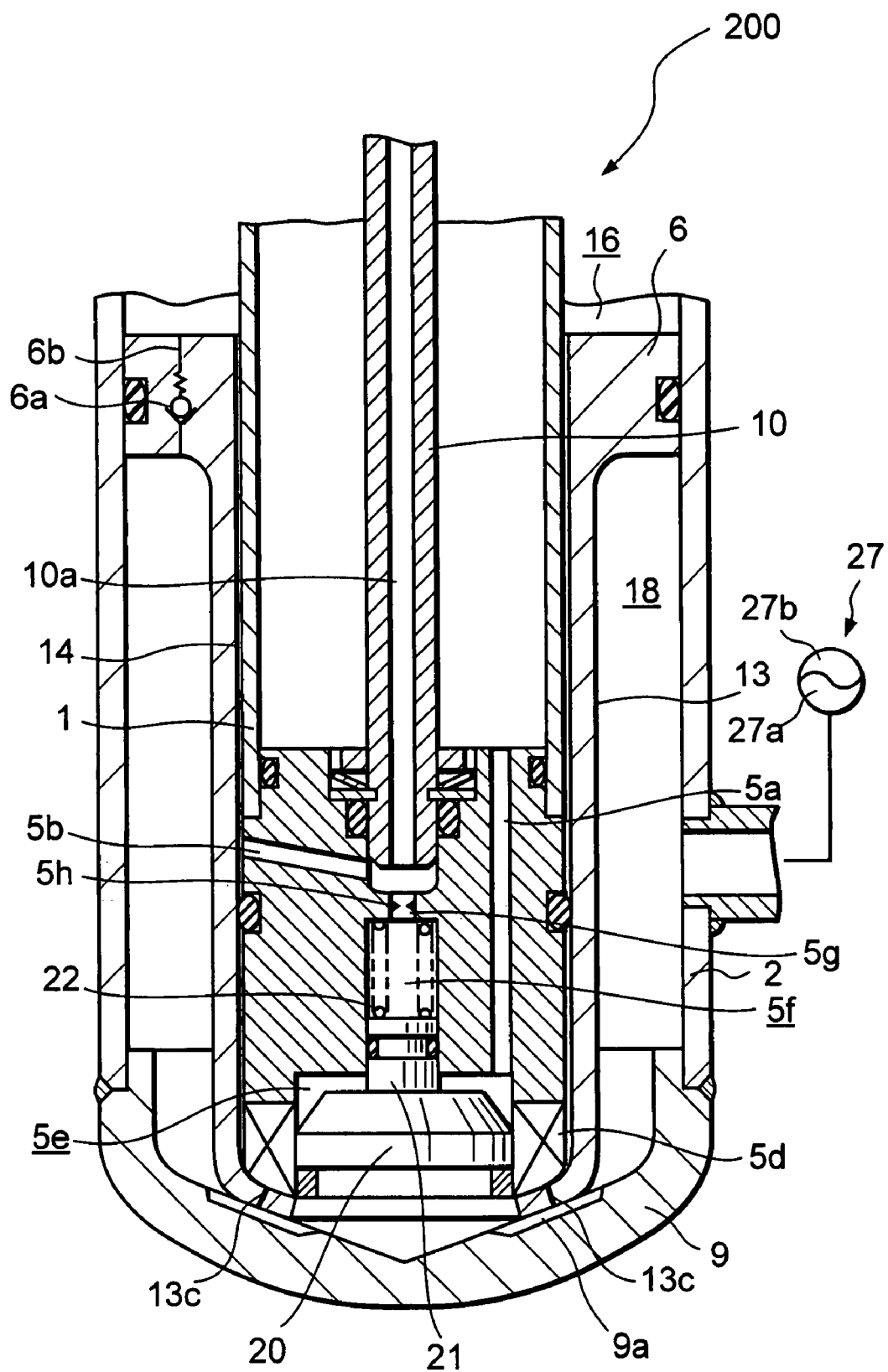
FIG. 4 is a partial cross sectional diagram showing the vehicle height adjusting device of the second embodiment of the present invention.
Figure 5:
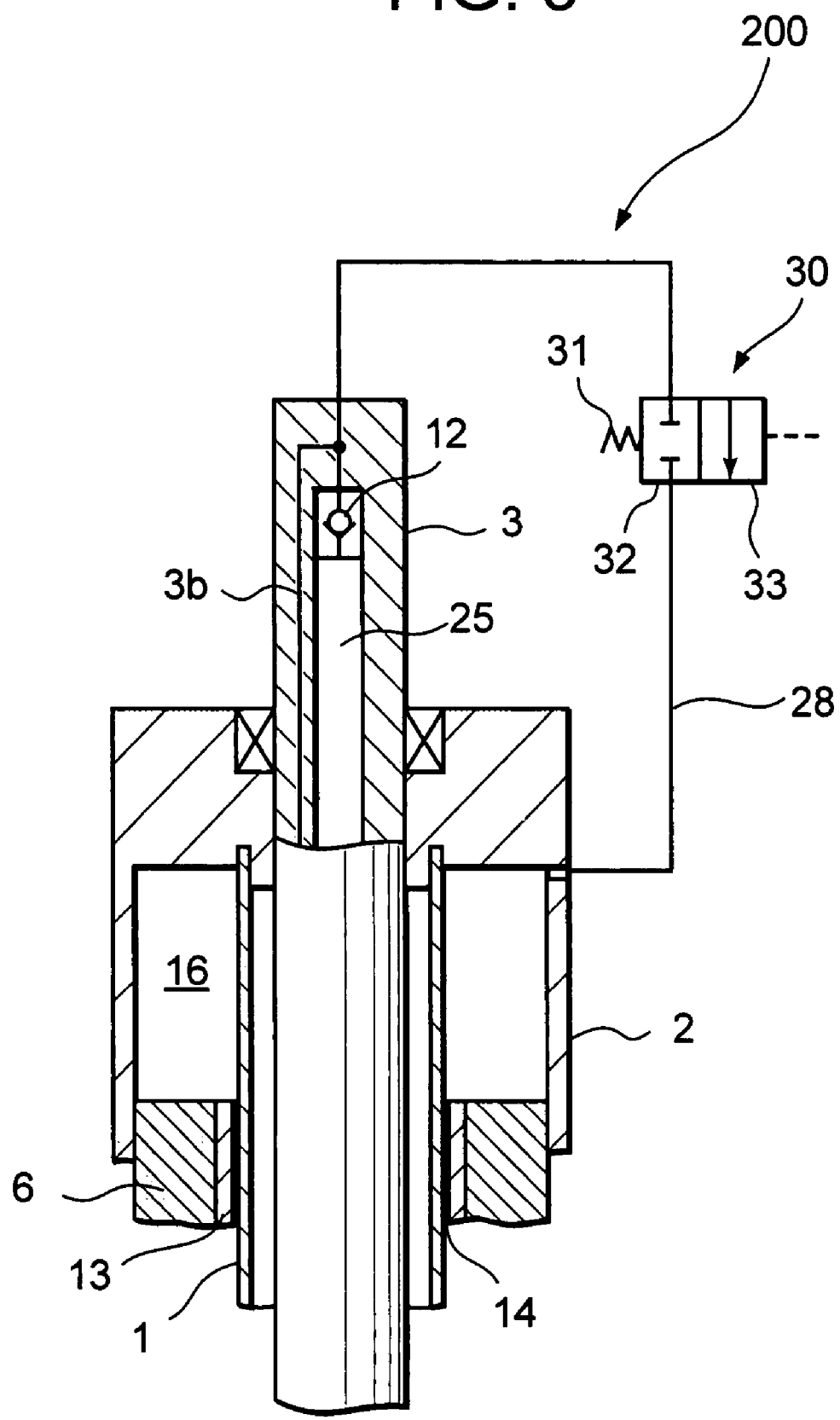
FIG. 5 is a partial cross sectional diagram showing a part of the vehicle height adjusting device illustrated in FIG. 4.

The difference between the vehicle height adjusting device 200 and the vehicle height adjusting device 100 of the above mentioned first embodiment is a point that, as illustrated in FIG. 4, the high pressure chamber 18 is communicated to an oil chamber 27a of the accumulator 27 arranged at outside the vehicle height adjusting device 200.

Therefore, the outer diameter of the outside barrel 2 can be set small, since the bladder 7 is not required to be arranged within the high pressure chamber 18 in the vehicle height adjusting device 200, and so the mountability of the vehicle height adjusting device 200 to a vehicle is improved. Further, the vehicle height adjusting device 200 can be made to light weighted, since the guide pipe 13 can be shortened.

Further, the control of the air chamber becomes easier compared to the case where the air chamber 19 is defined within the volume chamber 15 as in the above mentioned first embodiment, since an air chamber 27b regulating the oil pressure in the high pressure chamber 18 is also defined in the accumulator 27.

As described in the above mentioned first embodiment, the vehicle height adjusting device according to the present invention can adjust the vehicle height by the self-pumping mechanism and at the same time, can maintain the vehicle height. However, after the adjustment of the vehicle height is finished with extending action, the vehicle height can not be lowered by the vehicle height adjusting device 100 of the above mentioned first embodiment.

Thus, in the following, the vehicle height lowering means for forcedly contracting the vehicle height adjusting device in the extended state will be described with referring to FIG. 5.

The vehicle height lowering means is a switching valve 30 which is interveningly installed to the channel 28 communicating the through hole 3b of the rod 3 and the low pressure chamber 16, and has a blocking position 32 maintained with the biasing force of a spring 31 and a communicating position 33 that is switched to with an external input of a signal.

The switching valve 30 is switched over to the communicating position 33 from the blocking position 32 when a vehicle height lowering signal is entered by for example, an operator of the vehicle. The piston 4 is lowered to contract the vehicle height adjusting device 200, when the switching valve 30 is switched over to the communicating position 33, since the working oil in the non-rod side chamber 2b flows into the low pressure chamber 16 through the through hole 3b.

The construction of the vehicle height lowering means, a type of the signal entered to the vehicle height lowering means, and means of signal input may be of any constructions as far as the working oil in the non-rod side chamber 2b may be flowed into the low pressure chamber 16.

Further, in the above mentioned the first and the second embodiments, the high pressure chamber 18 communicating to the non-rod side chamber 2b is so constructed that it is defined within the volume chamber 15 in the outer periphery of the cylinder 1. However, the high pressure chamber 18 may also be arranged in series below the valve body 20. In this case, the downsizing of the overall vehicle height adjusting device can be achieved and the mountability thereof to the vehicle is improved since the outside barrel 2 can be omitted or the outer diameter of the outside barrel 2 can be made to small.

The present invention is obviously not limited to the above-described embodiment and can be modified in a variety of ways within the scope of the technical concept thereof.

What is claimed is:

1. A vehicle height adjusting device capable of adjusting a vehicle height of a vehicle comprising:
    a cylinder charged with working fluid;
    a rod inserted in the cylinder so as to have a back and forward movement;
    a piston connected to the rod and movable within the cylinder in a freely sliding manner, and defining a rod side chamber and an non-rod side chamber in the cylinder, the piston including a damping part for generating a damping force when the working fluid passes though the damping part during the back and forward movement of the rod;
    a low pressure chamber provided outside the cylinder and charged with low pressure gas in a part thereof;
    a high pressure chamber having a higher pressure than a pressure of the low pressure chamber and being provided outside the cylinder and charged with high pressure gas in a part thereof;
    a pump chamber for adjusting the vehicle height of the vehicle by supplying working fluid in the low pressure chamber into the non-rod side chamber with the back and forward movement of the rod;
    a communicating path for allowing fluid communication between the non-rod side chamber and the high pressure chamber;
    a valve body, movably disposed in a valve section of the communicating path between the non-rod side chamber and the high pressure chamber, the valve body movable between first and second ends of said valve section, for increasing and reducing a cross-sectional area of the communicating path in said valve section depending on a fluid pressure of the high pressure chamber that is applied to a back side of the valve body and a fluid pressure of the low pressure chamber that is applied to a front side of the valve body, said back side facing said first end of said valve section, said front side facing said second end of said valve section, said valve body and said valve section being arranged so that movement of said valve body toward said second end reduces said cross-sectional area, the valve body at any position in said valve section maintaining fluid communication between the non-rod side chamber and the high pressure chamber; and a biasing member biasing the valve body against the fluid pressure of the high pressure chamber, the valve body reducing said cross-sectional area by moving toward said second end so as to increase a resistance to working fluid that passes by the valve body from the non-rod side chamber to the high pressure chamber if a load that is based upon a pressure difference between the high pressure chamber and the low pressure chamber is greater than a biasing force of the biasing member.

2. The vehicle height adjusting device according to claim 1 further comprising a bottom block blocking an end part opening of the non-rod side chamber in the cylinder and formed with the communicating path penetrating therethrough, wherein the valve body is disposed within the bottom block in a freely sliding manner to increase and reduce said cross-sectional area by moving back and forward depending on the fluid pressure of the high pressure chamber which is applied to the back side of the valve body.

3. The vehicle height adjusting device according to claim 2 wherein:

the bottom block comprises a pilot chamber into which the working fluid of the low pressure chamber is guided;

the valve body comprises a guide part inserted into the pilot chamber in a freely sliding manner; and the pilot chamber is contained within the biasing member.

4. The vehicle height adjusting device according to claim 1, further comprising a path for communicating the high pressure chamber and the low pressure chamber, wherein the path is provided with a relieving valve allowing a flow of working fluid from the high pressure chamber to the low pressure chamber, when the pressure in the high pressure chamber exceeds the pressure in the low pressure chamber by a predetermined amount.

* * * * *